UNITED STATES PATENT OFFICE.

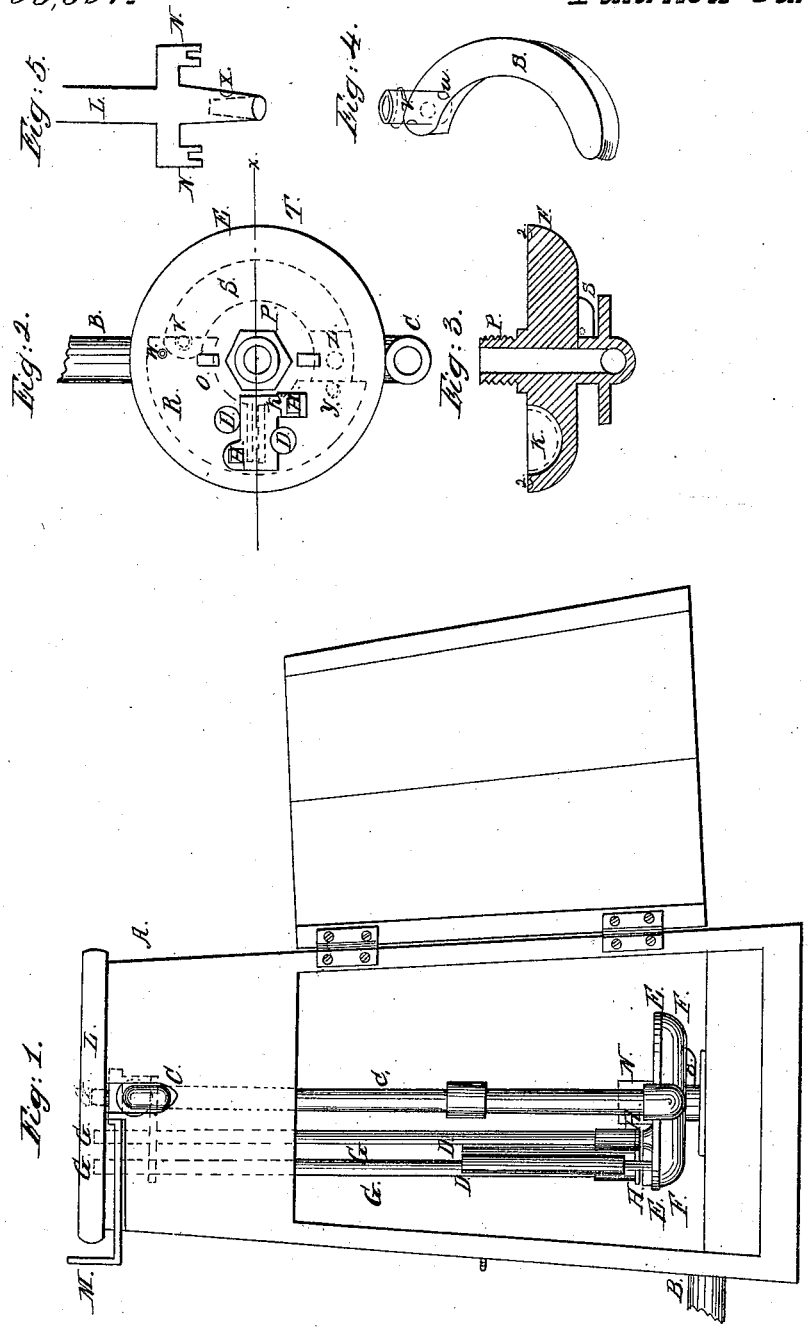

JOSEPH PAUDLER, JR., AND FRIEDRIK BAUSCHTLIKER, OF WASHINGTON, DISTRICT OF COLUMBIA.

IMPROVEMENT IN HYDRANTS.

Specification forming part of Letters Patent No. 55,357, dated June 5, 1866.

*To all whom it may concern:*

Be it known that we, JOSEPH PAUDLER, Jr., and FRIEDRIK BAUSCHTLIKER, of the city of Washington and District of Columbia, have invented new and useful Improvements in Hydrants, to prevent the water from freezing and wasting; and we do hereby declare the following to be an exact description thereof, reference being had to the accompanying drawings and to the letters of reference marked thereon, making a part of this specification.

Figure 1 represents a view of the hydrant; Fig. 2, a top view of the air and water chambers with their cut-offs and valves; Fig. 3, a sectional view of the reservoir; Fig. 4, a view of the water and air duct, with its ball or check valve; Fig. 5 represents the tongs and spigot for turning on or off the water.

A represents the hydrant-box; B, the water or supply pipe leading to the hydrant; C, the discharge-pipe.

D D are two air-tight pipes or air-chambers attached to the top plate, E, of the reservoir F.

G G are two long tongs or wrenches extending from the top of the box, to tighten the screw-nuts H H or take off the top J, when required to repair the packing K, when worn, without having to tear up the whole hydrant.

L is the center lever, with its crank M at top, and spigot and tongs N below, that clutch onto the projections O to turn the top plate, E, to let on or shut off the flow of water. This top plate, E, of the reservoir F works on a center screw, P, and fits closely on its inner edge in a groove, Q, of the reservoir F. The semi-circular packing or piston K has an india-rubber bottom and is attached to the under side of the plate J, and works in the semicircular grooved air-chamber R. At the end of the chamber R is an aperture or valve, W, opening downward, which connects with the supply-pipe B.

Another semicircular grooved air and water duct, S, having a ball or check valve, T, to rise and open upward, with apertures U and V, and the top aperture, V, connected with supply-pipe B, is located underneath the reservoir, and sufficiently large to hold all the water that the discharge-pipe C contains, thus holding all the water below instead of remaining in the discharge-pipe, as usual, so that the water is prevented from freezing.

The spigot or cock on lever L, at the lower end, is hollow, and has an aperture, X, at one side for the purpose of shutting off or letting on the flow of water from the supply-pipe B, the water flowing from the supply-pipe B into the orifice below and out of the aperture X when the hydrant is put in operation; but turning the crank M reverses the position of the aperture X, and the flow of water is stopped.

The operation of the hydrant is this: When the flow of water is to be stopped the crank M is turned to the right, and moves with it the lever L, tongs N, and the top plate, E, and draws the piston or cut-off K along the air-chamber R, forcing the air through the aperture and valve W into the supply-pipe B, and cutting off the water at X. At the same moment the suction or vacuum caused by the receding of the piston or packing K opens the valve at Z outward, and allows all the water to fall from the discharge-pipe C through the valve Z and the aperture Y down into the water-duct S, the water remaining there and prevented from freezing until the hydrant is again opened for the water to flow. By turning the crank M forward the air in the chamber R in front of piston K is pressed forward through the aperture Y, the valve Z being now closed, and into the duct S, forcing the water in the duct S back through the aperture U, raising the ball of valve T above the aperture V, until all the water and air have been forced back through the aperture V into the supply-pipe B, when the ball falls and closes aperture U. The hydrant then acts, and the water then flows directly again from the supply-pipe B through the aperture X of spigot L, and is discharged through pipe C.

Our invention is adapted also to water-plugs, commonly called fire-plugs, and will not easily get out of order, as its power is equal to eighty pounds pressure, while the ordinary water-pipes in city hydrants average about fifteen pounds pressure and rarely exceed twenty pounds pressure.

What we claim as our invention is—

The arrangement and combination of the grooved circular air and water chambers R and S, valve T, air-tubes D D, with the upright lever or wrench L, for letting on or cutting off the supply of water, and the upright levers or wrenches G G, to tighten the packing K, as herein described.

JOS. PAUDLER, JR.
FRIEDRIK BAUSCHTLIKER.

Witnesses:
J. FRANKLIN REIGART,
JOHN S. HOLLINGSHEAD.